US005842535A

United States Patent [19]
Dennis

[11] Patent Number: 5,842,535
[45] Date of Patent: Dec. 1, 1998

[54] ELECTRIC DRIVE ASSEMBLY FOR BICYCLES

[75] Inventor: Warren E. Dennis, Montecito, Calif.

[73] Assignee: Electric Transportation Company, LLC

[21] Appl. No.: 594,666

[22] Filed: Feb. 2, 1996

[51] Int. Cl.$^6$ ................................................ B62D 61/02
[52] U.S. Cl. ................ 180/205; 180/206; 180/220; 180/221
[58] Field of Search ............... 180/11, 65.2, 65.1, 180/220, 221, 342, 205, 206, 298; 280/215

[56] References Cited

U.S. PATENT DOCUMENTS

| | | |
|---|---|---|
| 1,832,018 | 11/1931 | Gossard . |
| 3,841,428 | 10/1974 | Bialek . |
| 3,878,910 | 4/1975 | Walker . |
| 3,905,442 | 9/1975 | O'Neill . |
| 3,966,007 | 6/1976 | Havener et al. . |
| 3,991,843 | 11/1976 | Davidson . |
| 4,030,562 | 6/1977 | Leighton et al. . |
| 4,168,758 | 9/1979 | Holt . |
| 4,175,629 | 11/1979 | Kalajzich .................. 180/220 |
| 4,183,418 | 1/1980 | Dudas ....................... 180/205 |
| 4,410,060 | 10/1983 | Cunard . |

FOREIGN PATENT DOCUMENTS

| | | | |
|---|---|---|---|
| 2704512 | 11/1994 | France ........................ 180/221 |
| 3014809 | 10/1981 | Germany .................... 180/205 |
| 3213043 | 10/1983 | Germany .................... 180/220 |
| 3623800 | 4/1987 | Germany .................... 180/220 |
| 654325 | 6/1951 | United Kingdom ........ 180/205 |
| 2262490 | 6/1993 | United Kingdom ........ 180/220 |
| WO 87/00500 | 1/1987 | WIPO ......................... 180/221 |
| WO 93/17904 | 9/1993 | WIPO ......................... 180/220 |

*Primary Examiner*—Brian L. Johnson
*Assistant Examiner*—Gary Savitt

[57] ABSTRACT

An electric drive assembly for driving a bicycle includes an electric power pack containing a battery or batteries, an electric motor, a drive wheel, a control circuit, a recharger and an electric switch in a common housing. A rack is installed about the rear wheel of the bicycle to support the power pack either with an operating orientation or backwards in a non-operating orientation for transportation. When the power pack is supported in its operating orientation, the drive wheel is engaged with the rear tire of the bicycle so that the drive wheel may frictionally drive the rear wheel of the bicycle; and the electric switch is aligned with and engagable by a switch actuator mounted on the rack. A control lever, which is mounted on the handlebar of the bicycle, may be operated to cause a control cable to pivot the switch actuator into engagement with the electric switch to close the circuit between the battery or batteries and the electric motor. A lid on the rack may be pivoted to an open position permitting the power pack to be lowered into the rack and may be pivoted to a closed position to engage the top wall of the power pack housing to retain a power pack in the rack. The power pack may be installed or removed quickly without the use of tools.

12 Claims, 5 Drawing Sheets

ELECTRIC DRIVE ASSEMBLY FOR BICYCLES

BACKGROUND OF THE INVENTION

1. Field of the Invention

This invention relates to battery-powered bicycles and more particularly, to a power pack for such bicycles which is easily installed and removed.

2. Description of the Prior Art

It is known in the prior art to provide battery-powered bicycles to augment the driver's pedal power. In U.S. Pat. No. 3,878,910, for example, an electric drive unit includes batteries housed in separate casings acting as "saddle bags" at either side of the rear wheel of the bicycle. An electric motor, which is mounted above the wheel, rotates a drive roller which frictionally drives the bicycle wheel. The batteries and the motor are separately housed and are controlled by an electrical switch on a handlebar of the bicycle. The electric power-assisted bicycles of U.S. Pat. Nos. 4,030,562; 4,410,060; 3,905,442; 3,841,428; 3,966,007; 4,168,758; and 3,991,843 also provide separate mountings and housings for the battery and the motor. As a result, it is not a simple matter to install or remove the electric drive systems of these prior art disclosures. The components of these prior art systems must be installed separately.

U.S. Pat. No. 1,832,018 shows a self-propelled scooter with a housing having compartments on opposite sides of the drive wheel and with batteries supported from the bottoms of the compartments. A compartment above the wheel houses the drive motor, which is coupled to the wheel by means of a clutch, controlled by a lever extending out through the wall of the casing, and a drive belt. An electric switch is mounted on the handlebar of the scooter for making an electrical connection between the batteries and the motor circuit. This system also can not be easily installed to power a bicycle.

SUMMARY OF THE INVENTION

It is the object of the invention to provide an electric drive assembly for a bicycle which is easy to install and remove, which can be mounted in operating and non-operating orientations, and which can be installed quickly without the use of tools.

According to the invention, a removable power pack contains one or more batteries, an electric motor, a control circuit, a recharger, a switch for completing a circuit between the battery or batteries and the electric motor, and a friction drive wheel within a common housing. A rack, which is easily installed on almost any standard bicycle, is adapted to support and align the power pack properly over the rear tire of the bicycle so that the power pack is supported by the rack with the friction drive wheel engaged against the top of the rear tire. The power pack is installed in the rack in a matter of seconds without the need for any tools.

A handlebar control, which is easily installed on the handlebar of the bicycle in the same manner as the rear brake lever, operates a cable which is attached to a switch actuator mounted on the rack. When the power pack is installed in the rack with an operating orientation, the switch actuator is aligned and engagable with the switch in the power pack. No other connection is required between the actuator and the power pack.

The bicycle can be used and ridden with or without the removable power pack. The power pack may be mounted backwards in the rack with the non-operating orientation for transporting the power pack without the drive wheel engaged with the rear tire of the bicycle.

The rack includes a pair of U-shaped support members on respective sides of the rear wheel of the bicycle. Each support member has a pair of vertical portions connected by a bottom horizontal portion extending parallel to the longitudinal axis of the bicycle. The power pack includes a pair of depending portions received in the respective U-shaped support members and seated on the bottom horizontal portions so that the depending portions straddle the rear wheel of the bicycle and form a slot for the rear wheel. In order to hold the power pack in place in the rack the rack includes a pivoted lid. The top of the housing of the power pack is partly arcuate and partly flat, and the lid has a corresponding complementary recess so that the lid when closed engages the top of the housing snugly. A spring latch is also provided to latch the lid in its closed position.

When the lid is raised to an open position, the power pack may be installed in the rack. The power pack is lowered into the rack, either with an operating or non-operating orientation. The lid is then lowered to its closed, latched position. When the power pack is in the operating orientation, the drive wheel engages the rear tire of the bicycle and the switch in the power pack is aligned with and engagable by the actuator.

BRIEF DESCRIPTION OF THE DRAWINGS

A clearer understanding of the invention will be apparent from the following description and drawings, wherein.

DETAILED DESCRIPTION

Figure 1:
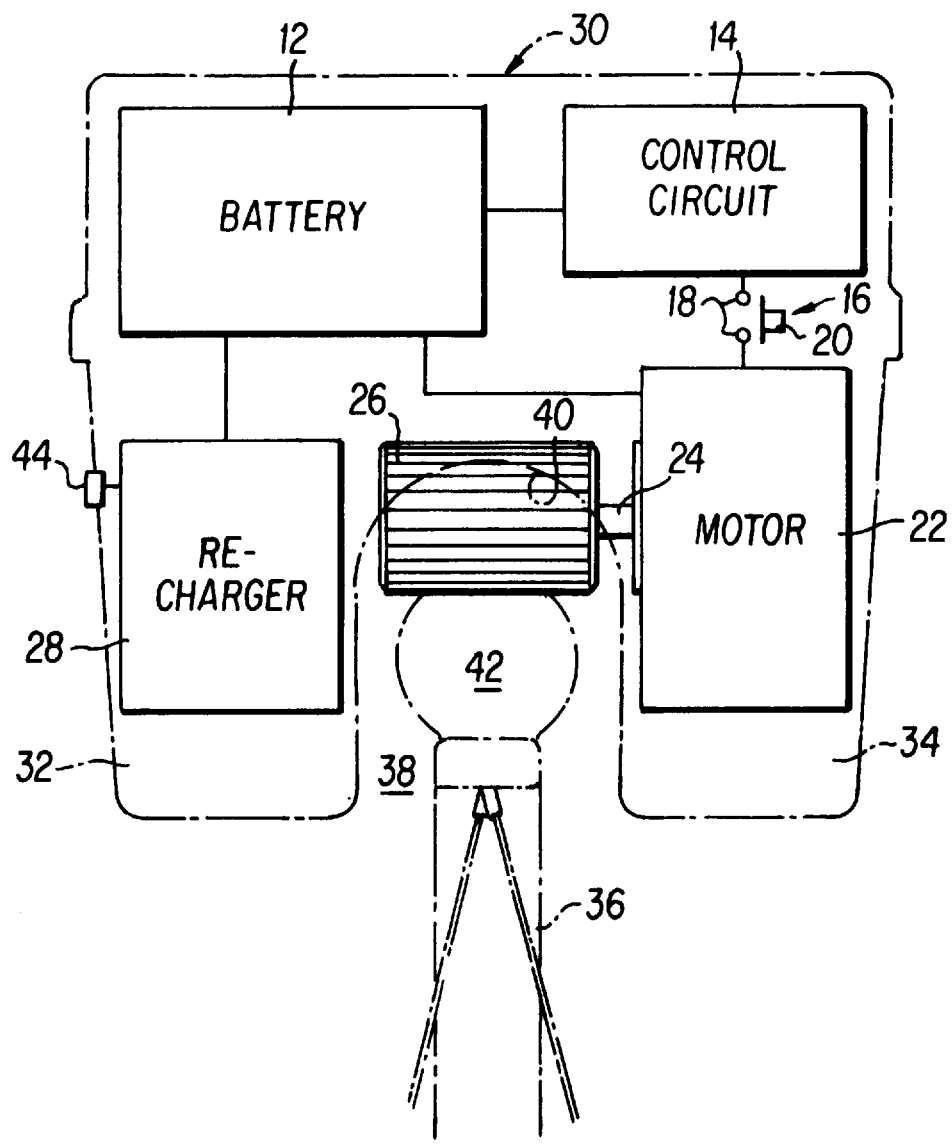
FIG. 1 is a schematic diagram of an electric power pack of the invention mounted over the rear wheel of a bicycle.

As seen in the schematic diagram of FIG. 1, an electric drive assembly of the invention includes an electric power pack 10, having one or more batteries 12, a control circuit 14, an electric switch 16, which includes a pair of contracts 18 and a push button switch operator 20, an electric motor 22, a motor shaft 24 and a frictional drive wheel or roller 26, and a recharger 28 for recharging the battery or batteries 12. All of these components are housed in a common power pack casing 30, which has a pair of depending portions 32 and 34 adapted to straddle the rear wheel 36 of a bicycle. In order to accommodate the bicycle wheel, a slot 38 is formed between depending portions 32 and 34. There is an opening through the casing at the top 40 of slot 38 to allow drive roller 26 to extend into slot 38 so that it can engage with the top of tire 42 of bicycle wheel 36. It will thus be apparent that with drive roller 26 so engaged with tire 42, closure of switch 16 will cause energization of motor 22 which will then rotate drive roller 26 to frictionally drive bicycle wheel 36.

Recharger 28 may be connected to a source of D.C. voltage through an external connector 44 when power pack 10 is not in use. Alternatively, battery or batteries 12 may be recharged when motor 22 operates as a generator, as, for example, when the bicycle is moving downhill.

It is to be understood that the arrangement of the components shown within power pack 10 is illustrative only. The components may be arranged within casing 30 in any convenient manner. However, motor 22 will be suitably positioned to drive roller 26, which will be positioned as shown. Although roller 26 is shown as directly driven by motor shaft 24, it will be understood that a suitable drive train including gearing may be interposed between motor 22 and drive roller 26.

Figure 2:
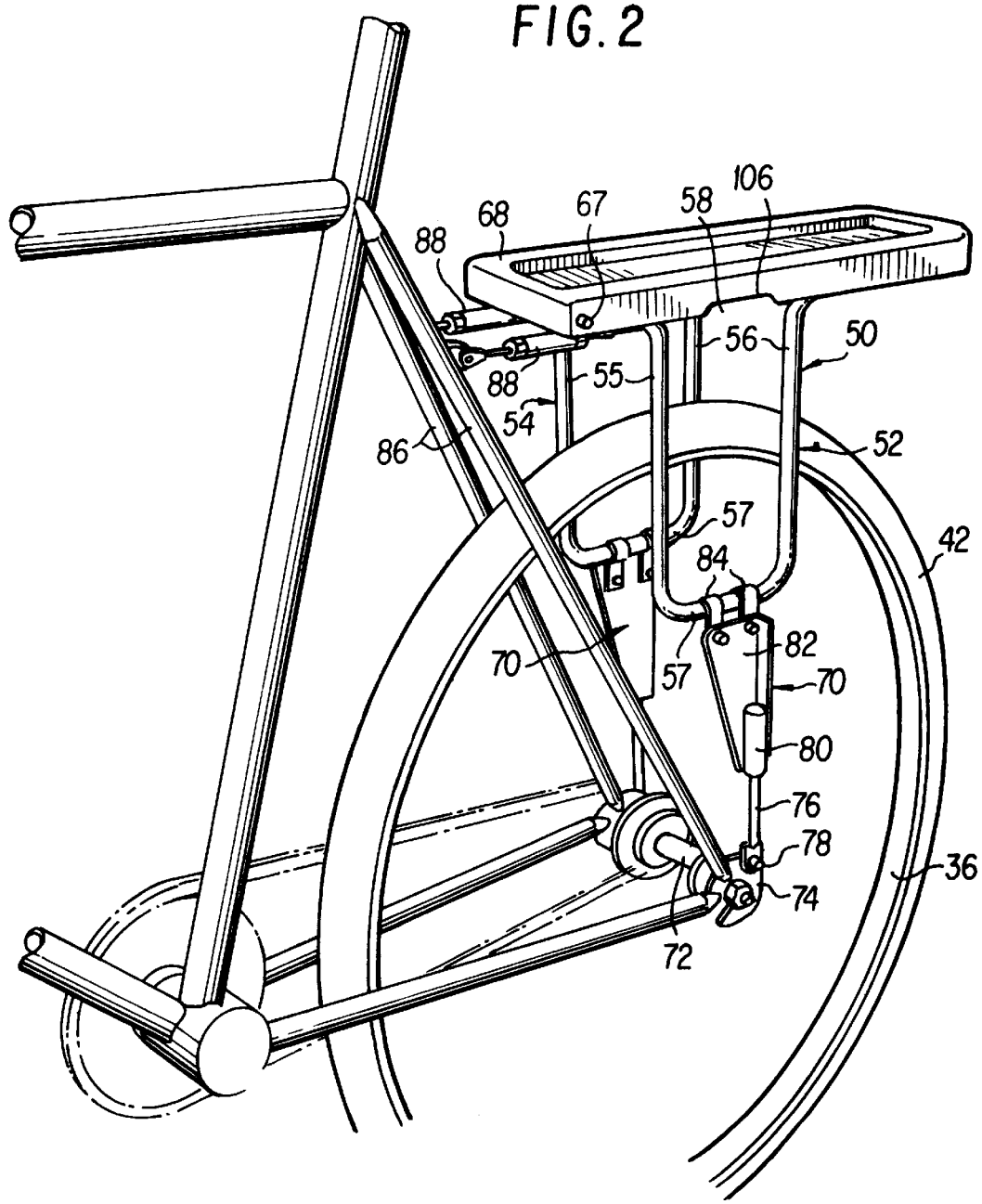
FIG. 2 is a partial perspective view of a rack of the invention mounted over the rear wheel of a bicycle with no power pack installed and with the lid pivoted to its closed position.
Figure 3:
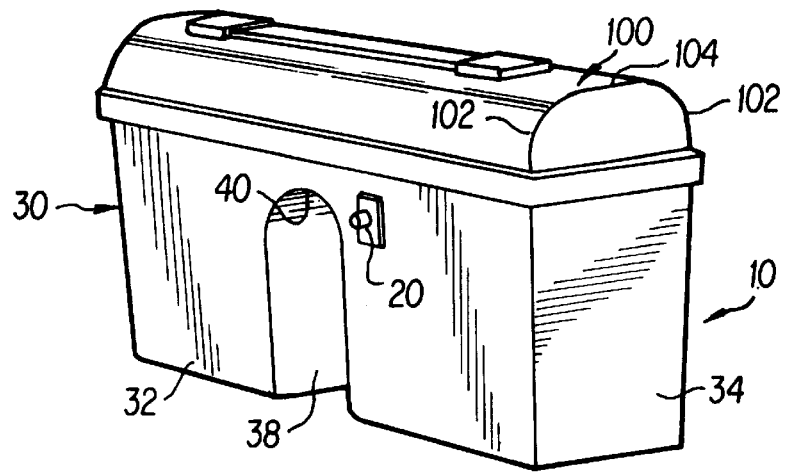
FIG. 3 is a partial perspective view of the rack of the invention mounted over the rear wheel of a bicycle with the lid partially open and a power pack poised to be installed in the rack.
Figure 3:
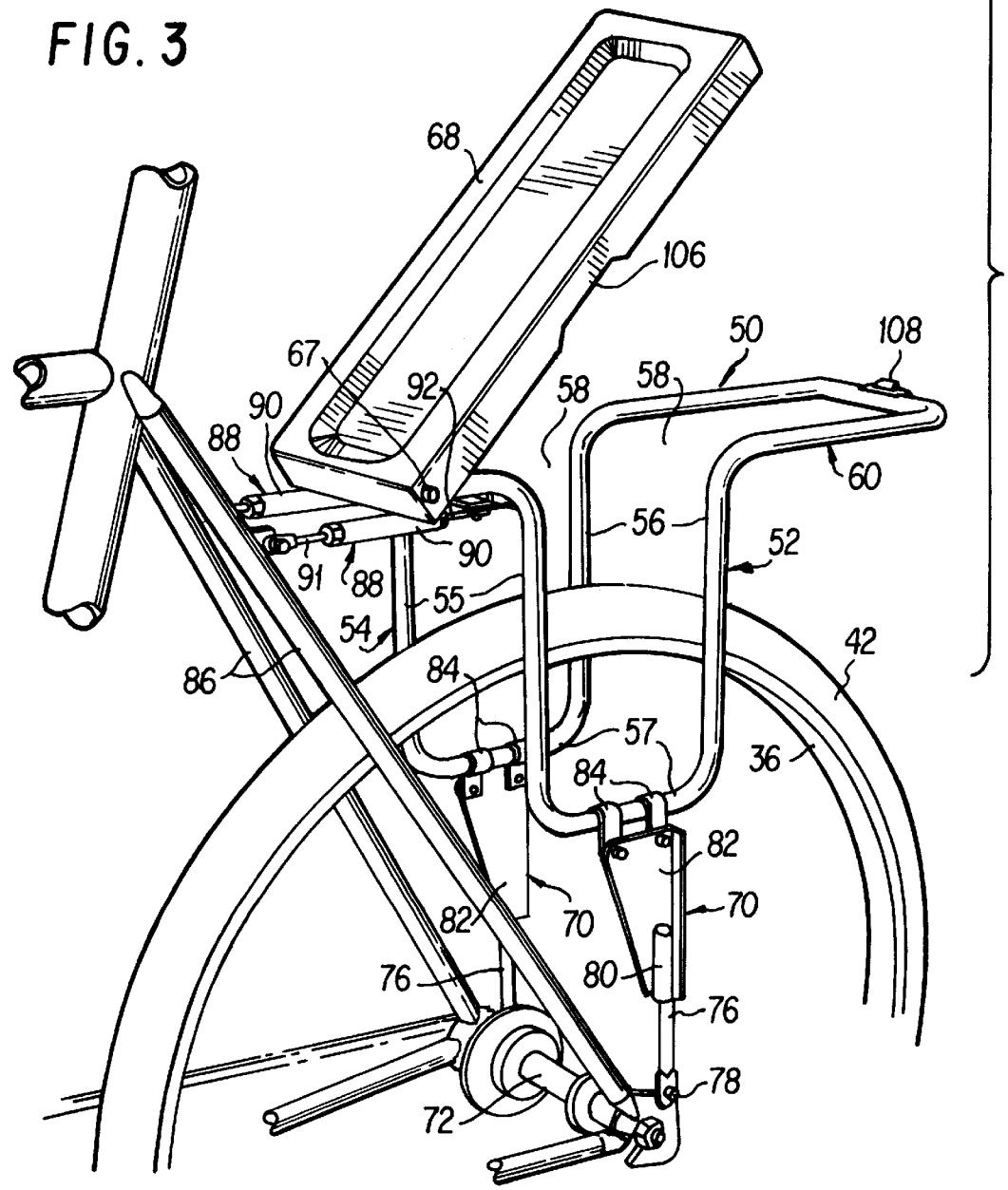
Figure 4:
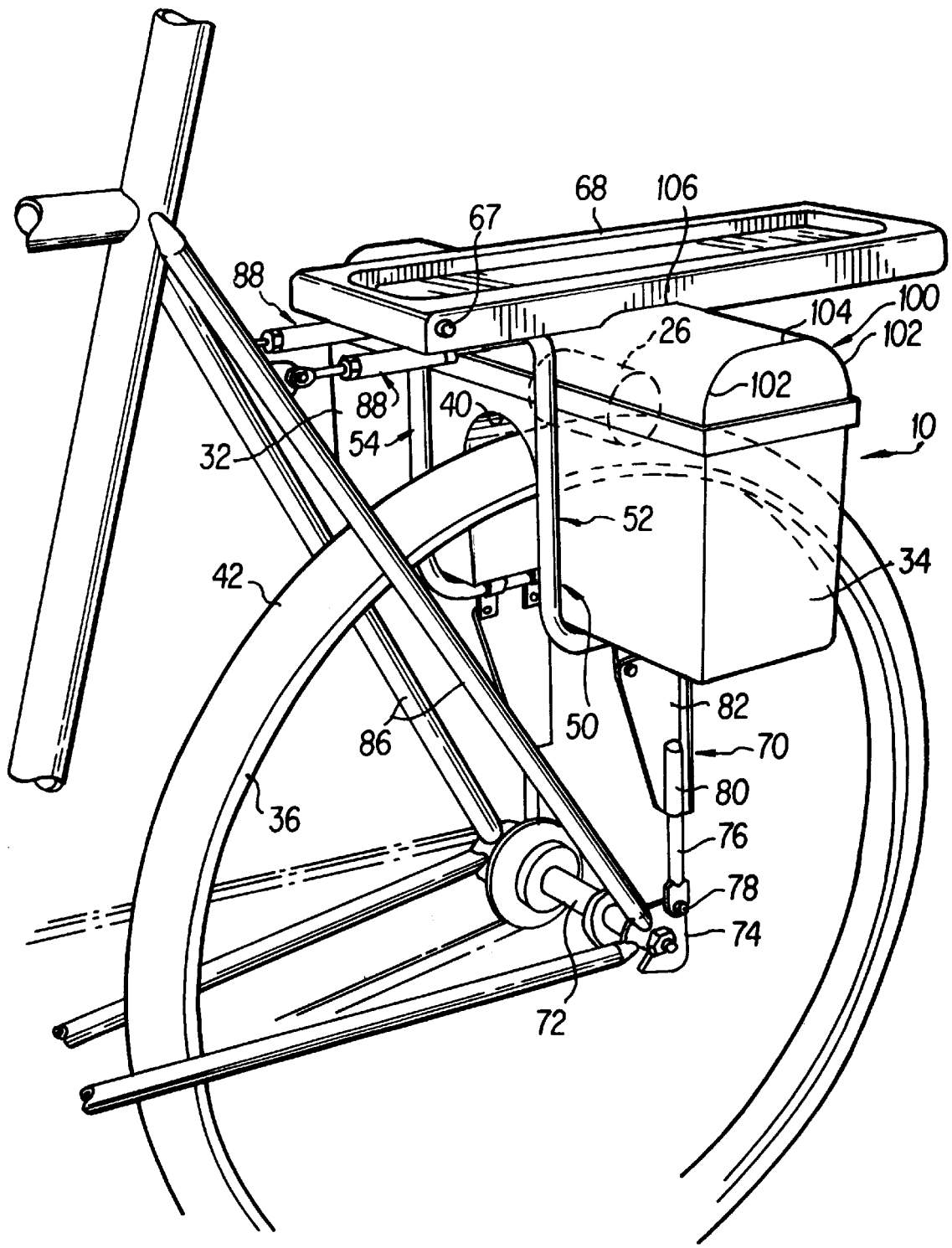
FIG. 4 is a partial perspective view of the rack of the invention with the power pack installed therein and with the lid in its closed position enclosing the power pack in the rack.
Figure 5:
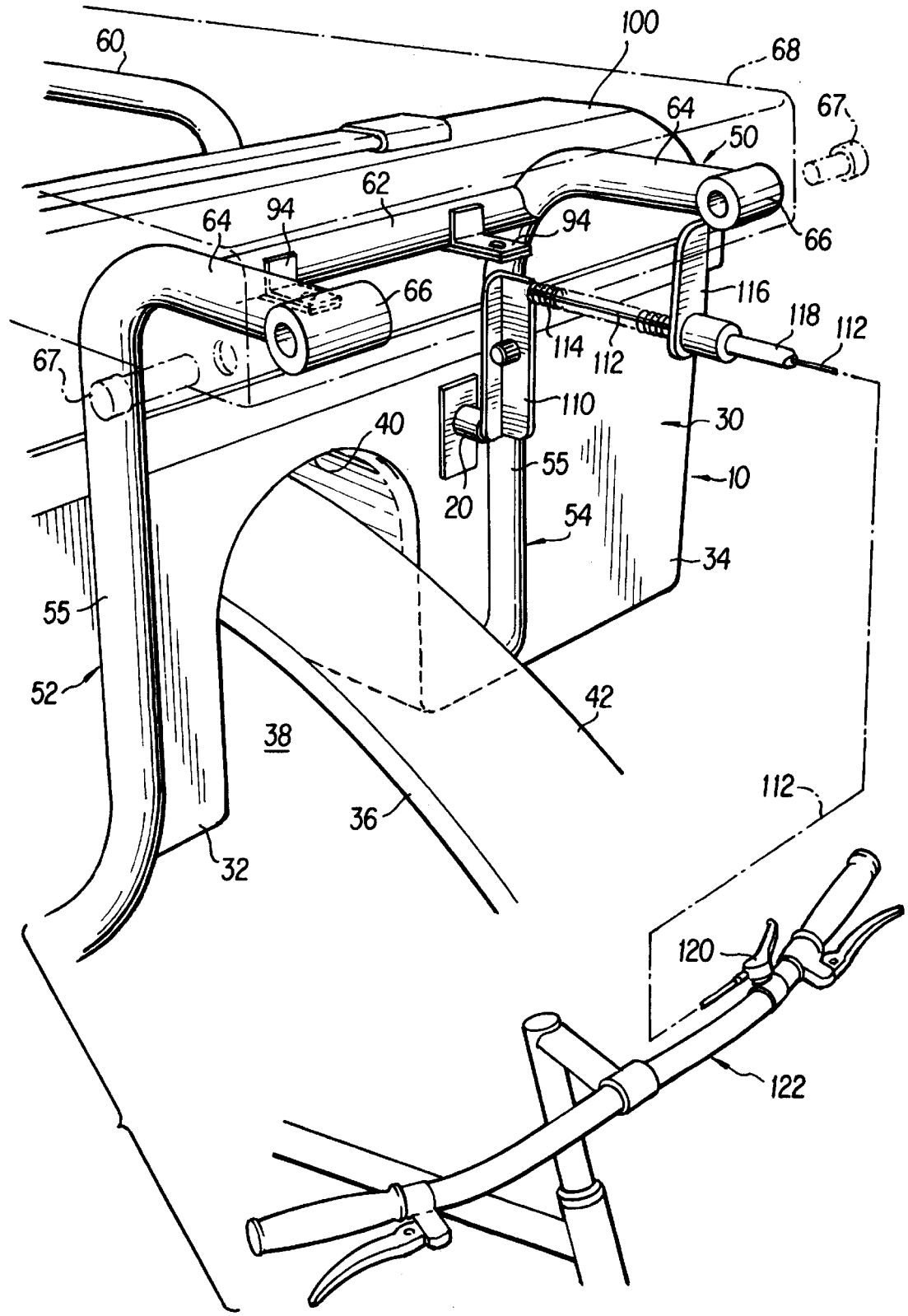
FIG. 5 is a partial perspective view showing a power pack installed in a rack of the invention with a switch actuator mounted on the rack aligned and engagable with a switch member projecting from the power pack.

Power pack 10 is mounted on a bicycle by a rack 50 which is best shown in FIGS. 2–5. Referring to FIGS. 2 and 3, rack 50 includes a pair of U-shaped support members 52 and 54 which are mounted to lie in respective planes parallel to the longitudinal axis of a bicycle on opposite sides of the rear wheel 36 of the bicycle. U-shaped support members 52 and 54 each have a pair of vertical rod portions 55 and 56 connected by a bottom horizontal rod portion 57. The tops 58 of U-shaped members 52 and 54 are open to permit installation of power pack 10, as will be explained. As best seen in FIG. 3, the tops of vertical rod portions 56 are connected by a horizontal U-shaped portion 60 which extends rearwardly of the bicycle. As seen in FIG. 5, a cross rod 62 connects the upper ends of vertical rod portions 55, and horizontal rod portions 64 extend forwardly of the bicycle to support bearings 66. A pivot pin 67 is journalled in bearing 66 for pivoting lid 68 (shown in phantom line FIG. 5).

Rack 50 is mounted on the bicycle by means mounting assemblies 70 which attach horizontal rod portions 57 to the rear axle 72 of the bicycle. Mounting assemblies 70 each include a mounting tab 74 on axle 72, and a threaded rod 76 bolted at 78 to tab 74. Threaded rod is adjustably threaded to a sleeve 80 which is welded to a plate 82. Mounting straps 84 are bolted to the top of plate 82 and are snugly wrapped around horizontal rod portion 57. In order to secure rack 50 to bicycle frame members 86, a pair of adjustable strut assemblies 88 are provided between horizontal rod 62 and frame members 86. Strut assemblies 88 each include a threaded sleeve 90 from both ends of which extend threaded rods 91 and 92, permitting adjustment of the length of strut assemblies 88. Rods 92 are attached to tabs 94 mounted on rod 62, and rods 91 are attached to members 96 secured to frame members 86.

As mentioned above, rack 50 includes a pivoted lid 68. Casing 30 of power pack 10 includes a cover 100, which is removable or pivotable to provide access to the components within casing 30. Cover 100 is arcuate from its edges at 102 with a flat top 104, and lid 68 is provided with a complementary recess 106 so that the lid will snugly engage with cover 100 when lid 68 is in its closed position. As seen in FIG. 3, a spring latch 108 is mounted on the base of U-shaped portion 60 of frame 50. When lid 68 is closed, as shown in FIGS. 2 and 4, latch 108 engages an edge of lid 68 to latch it in the closed position.

As shown in FIG. 5, switch operator 20 protrudes from casing 30 of power pack 10. Switch 18 may, for example, be a push-push switch which, when pushed, alternately closes and opens the circuit. In order to operate switch 18, a switch actuator 110 is pivotally mounted on vertical rack portion 55 of the U-shaped portion 54. The upper end of actuator 110 is attached to the end of a cable 112 which is surrounded by a helical spring 114 between actuator 110 and a tab 116, which is secured to and depends from the outer surface of one of the bearings 66. Cable 112 extends through a tubular member 118 to a control lever 120 mounted on the handlebar 122 of the bicycle. As will be recognized, control lever 120 and cable 112 operate in the same manner as the common brake operating lever mounted on a handlebar. Indeed, the switch control lever 120 may be placed adjacent an existing brake operating lever on the handlebar. Since switch actuator is aligned and engagable with switch operator 20, operation of control lever 120 results in pivoting of actuator 110 into engagement with switch operator 20 to close the circuit and turn on motor 22. When the control lever is released, spring 114 will bias actuator 110 back to its initial position out of engagement with switch-operator 20.

Power pack 10 can be installed in rack 50 with an operating orientation as shown in the drawings. When, however, the bicyclist wishes to merely transport power pack 10, it may be installed backwards with a non-operating orientation in which tire 42 is not engaged by drive roller 26 and actuator 110 is not aligned and engagable with switch operator 20.

FIG. 2 shows rack 50 with lid 68 in its closed position, but with no power pack 10 installed in rack 50. In FIG. 3, a power pack 10 is in position to be installed in rack 50, the lid 68 of which is pivoted to an open position. In FIG. 4, power pack 10 is installed in rack 50. Depending portions 32 and 34 of power pack housing 30 rest on horizontal portions 57 of rack 50, and lid 68 is closed and latched in the closed position. Recess 106 of lid 68 snugly engages cover 100 of power pack 10. When in this position, drive wheel 26 engages tire 42 of rear wheel 36 of the bicycle. Switch actuator 110 is in position to be operated by control lever 120 to operate switch 18 to turn on motor 22 and provide drive power to -the bicycle.

The installation of power pack 10 is accomplished quickly and easily and does not require the use of tools. As soon as power pack 10 is installed in rack 50 in its operating orientation, it is ready to supply power to the bicycle.

It should be understood that the foregoing description of the invention is intended merely to be illustrative and other modifications, embodiments and equivalents may be apparent to those skilled in the art without departing from the spirit and scope of the invention.

The invention claimed is:

1. An electric drive assembly for driving a bicycle, comprising:

an electric power pack including electric battery means, an electric motor and drive means driven by said electric motor in a single housing; and rack means for supporting said power pack as a whole on a bicycle in an operating orientation, said drive means being so positioned in said power pack when said power pack is in said operating orientation that said drive means engages a wheel of said bicycle said rack means being so configured that said power pack as a whole is readily insertable within and removable from said rack means without the use of tools.

2. An electric drive assembly of claim 1, wherein said power pack includes switch means for completing a circuit between said electric battery means and said motor, and wherein said assembly further comprises control means for actuating said switch means, said control means comprising an actuator mounted on said rack means, said actuator being so positioned that it is aligned and engagable with said switch means when said power pack as a whole is in said operating orientation.

3. An electric drive assembly of claim 2, wherein said control means further comprises a control element mounted on said bicycle and coupling means linking said control element to said actuator.

4. An electric drive assembly of claim 3, wherein said control element is mounted on a handlebar of said bicycle.

5. An electric drive assembly of claim 1, wherein said rack means supports said power pack over a wheel of said bicycle.

6. An electric drive assembly of claim 5, wherein said power pack includes depending portions straddling said wheel forming a slot for said wheel.

7. An electric drive assembly of claim 6, wherein said rack means comprises a pair of U-shaped support members on respective sides of said wheel, each support member having a pair of vertical portions connected by a bottom horizontal portion, said depending portions of said power pack being seated on said respective bottom horizontal portions and said power pack being situated between said vertical portion when said power pack is supported on said rack means.

8. An electric drive assembly of claim 6, wherein said drive means comprises a friction wheel within said slot engaged with said bicycle wheel when said power pack is supported in said operating orientation.

9. An electric drive assembly of claim 5, wherein said wheel is the rear wheel of said bicycle.

10. An electric drive assembly of claim 1, wherein said rack means comprises a pivoted lid;

and wherein said housing has an upper surface, said lid being pivotable to an open position opening said rack means to receive said power pack as a whole and to a closed position engaging said upper surface to enclose said power pack in said rack means and retain it in said operating orientation.

11. An electric drive assembly of claim 10, wherein said upper surface is partly arcuate and said lid has a recess complementary to and engaged with said upper surface.

12. An electric drive assembly of claim 10, further comprising latch means to latch said lid in said closed position.

* * * * *